US012283275B2

(12) United States Patent
Chiang et al.

(10) Patent No.: US 12,283,275 B2
(45) Date of Patent: *Apr. 22, 2025

(54) METHOD FOR CONTROLLING REMOTE CONTROLLER TO AVOID LOSS OF FUNCTION THROUGH A LOW VOLTAGE CONDITION, REMOTE CONTROLLER DEVICE, AND NON-TRANSITORY STORAGE MEDIUM

(71) Applicant: Nanning FuLian FuGui Precision Industrial Co., Ltd., Nanning (CN)

(72) Inventors: Huang-Yu Chiang, New Taipei (TW); Chung-Chih Yeh, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,558

(22) Filed: Nov. 10, 2023

(65) Prior Publication Data

US 2024/0079010 A1    Mar. 7, 2024

Related U.S. Application Data

(63) Continuation of application No. 17/705,519, filed on Mar. 28, 2022, now Pat. No. 11,862,163, which is a
(Continued)

(51) Int. Cl.
*G10L 15/22*      (2006.01)
*G08C 23/00*      (2006.01)

(52) U.S. Cl.
CPC .............. *G10L 15/22* (2013.01); *G08C 23/00* (2013.01); *G08C 2201/12* (2013.01); *G10L 2015/223* (2013.01)

(58) Field of Classification Search
CPC ......... G10L 15/22; G10L 15/02; G10L 17/02; G10L 13/00; G10L 15/063; G10L 15/26;
(Continued)

(56) References Cited

U.S. PATENT DOCUMENTS 6,359,547 B1 *   3/2002   Denison ................ B60R 25/102
                                                      340/663
10,342,104 B2    7/2019   Recker et al.
(Continued)

FOREIGN PATENT DOCUMENTS

CN        103560304 A        2/2014
CN        104009619 A        8/2014
(Continued)

*Primary Examiner* — Vijay B Chawan
(74) *Attorney, Agent, or Firm* — ScienBiziP, P.C.

(57) ABSTRACT

A method of controlling a battery-powered remote controller to decrease a duty cycle to allow continued operations despite the quantity of the battery is bad. The method determines a drop in voltage of the battery in standby mode as voltage of the battery is being read. When receiving a command to activate a voice function, determining whether the drop in voltage in the standby mode is greater than or equal to a preset value. If the drop is greater than or equal to the preset value, the method then determines whether the drop in voltage falls in a preset range. If the drop falls in the preset range, the method regulates a duty cycle of the pulse signal activating the voice function, and activates the voice function as required. A remote controller and a non-transitory storage medium are also provided.

15 Claims, 5 Drawing Sheets

Related U.S. Application Data continuation of application No. 16/517,909, filed on Jul. 22, 2019, now Pat. No. 11,348,578.

(58) Field of Classification Search
CPC ............... G10L 17/04; G10L 2015/223; G10L 2015/228; G08C 2201/12; G08C 23/00
See application file for complete search history.

(56) References Cited

U.S. PATENT DOCUMENTS

| | | | |
|---|---|---|---|
| 11,348,578 B2* | 5/2022 | Chiang | G08C 23/00 |
| 11,348,957 B2* | 5/2022 | Mun | H01L 27/14683 |
| 11,862,163 B2* | 1/2024 | Chiang | G08C 23/00 |
| 2003/0007649 A1* | 1/2003 | Riggs | H04N 21/42204 |
| | | | 381/86 |
| 2009/0043580 A1* | 2/2009 | Mozer | G10L 13/00 |
| | | | 704/E15.001 |
| 2009/0189739 A1* | 7/2009 | Wang | H04Q 9/00 |
| | | | 340/10.1 |
| 2011/0025459 A1* | 2/2011 | Denison | G07F 7/1008 |
| | | | 340/5.51 |
| 2011/0050391 A1* | 3/2011 | Denison | G07C 9/00912 |
| | | | 340/5.51 |
| 2011/0276609 A1* | 11/2011 | Denison | G07F 9/001 |
| | | | 707/812 |
| 2011/0289123 A1* | 11/2011 | Denison | G07F 5/26 |
| | | | 707/812 |
| 2012/0065972 A1* | 3/2012 | Strifler | G10L 15/26 |
| | | | 704/246 |
| 2015/0073795 A1* | 3/2015 | Tan | G10L 17/02 |
| | | | 704/243 |
| 2015/0371638 A1* | 12/2015 | Ma | G10L 15/02 |
| | | | 704/275 |
| 2016/0351197 A1* | 12/2016 | Tan | G10L 17/02 |
| 2018/0184506 A1* | 6/2018 | Recker | H05B 45/00 |
| 2018/0332384 A1* | 11/2018 | Wilker | H04R 3/04 |
| 2018/0354461 A1* | 12/2018 | Yae | G10L 15/22 |

FOREIGN PATENT DOCUMENTS

| | | |
|---|---|---|
| CN | 104345277 A | 2/2015 |
| CN | 104895723 A | 9/2015 |
| CN | 205486745 U | 8/2016 |
| EP | 1632190 A1 | 3/2006 |
| TW | 200423785 A | 11/2004 |
| WO | 2017197383 A1 | 11/2017 |

* cited by examiner

METHOD FOR CONTROLLING REMOTE CONTROLLER TO AVOID LOSS OF FUNCTION THROUGH A LOW VOLTAGE CONDITION, REMOTE CONTROLLER DEVICE, AND NON-TRANSITORY STORAGE MEDIUM

FIELD

The subject matter herein generally relates to remote controllers.

BACKGROUND

BLUETOOTH remote controllers with voice function are commonly applied on consumer electronics, for example, Over-The-Top (OTT) set-top box, digital set-top box, multimedia player, IoT, and so on. A drop in voltage occurs regularly in a battery of the remote controller at fixed intervals when the remote controller is in standby mode. Using the voice function consumes most electric current, especially at the moment of starting the voice function, a rush of current arises in the remote controller, and such an instance causes a drop in voltage becomes greater just when the voice function is started. Thus, the voltage of the battery becomes lower. When the voltage of the battery of the remote controller is lower than a minimum work voltage of a chip in the remote controller, the operating system of the remote controller will reset. In particular, when the battery is low, a probability of resetting the operating system becomes higher. Such resetting occurrences have adverse effects on users' experience.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
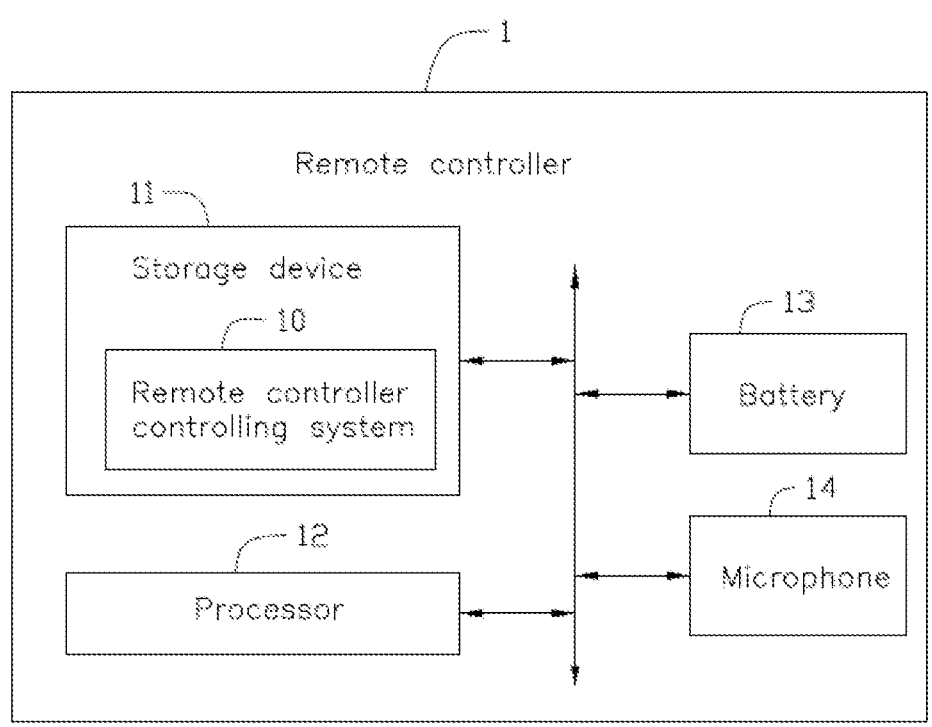
FIG. 1 is a block diagram illustrating a battery-powered remote controller according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

FIG. 1 illustrates a block diagram of an embodiment of a remote controller 1. A remote controller controlling system 10 is applied on the remote controller 1. The remote controller 1 can include, but is not limited to, a storage device 11, at least one processor 12, a battery 13, and a microphone 14. The aforementioned components of the remote controller 1 are interconnected via a bus, or are directly interconnected. The remote controller 1 can control various electrical devices, for example, air conditioner, television, set-top box, DVD player, and so on. The remote controller 1 is connected to the electrical devices via a communication unit. The communication unit can be a BLUETOOTH unit, or the like. In the embodiment, the remote controller 1 can include other one or more communication units, for example, a WI-FI unit, and the like. FIG. 1 illustrates only an example, in other embodiment, the remote controller 1 can include more or less components, or include more or different type of devices.

In the embodiment, the battery 13 can be a chargeable battery or a non-rechargeable battery. The battery 13 is configured to provide power for the remote controller. For example, the battery 13 can be a lithium battery.

In the embodiment, the microphone 14 is configured to receive vocal commands and recognize the same.

Figure 2:
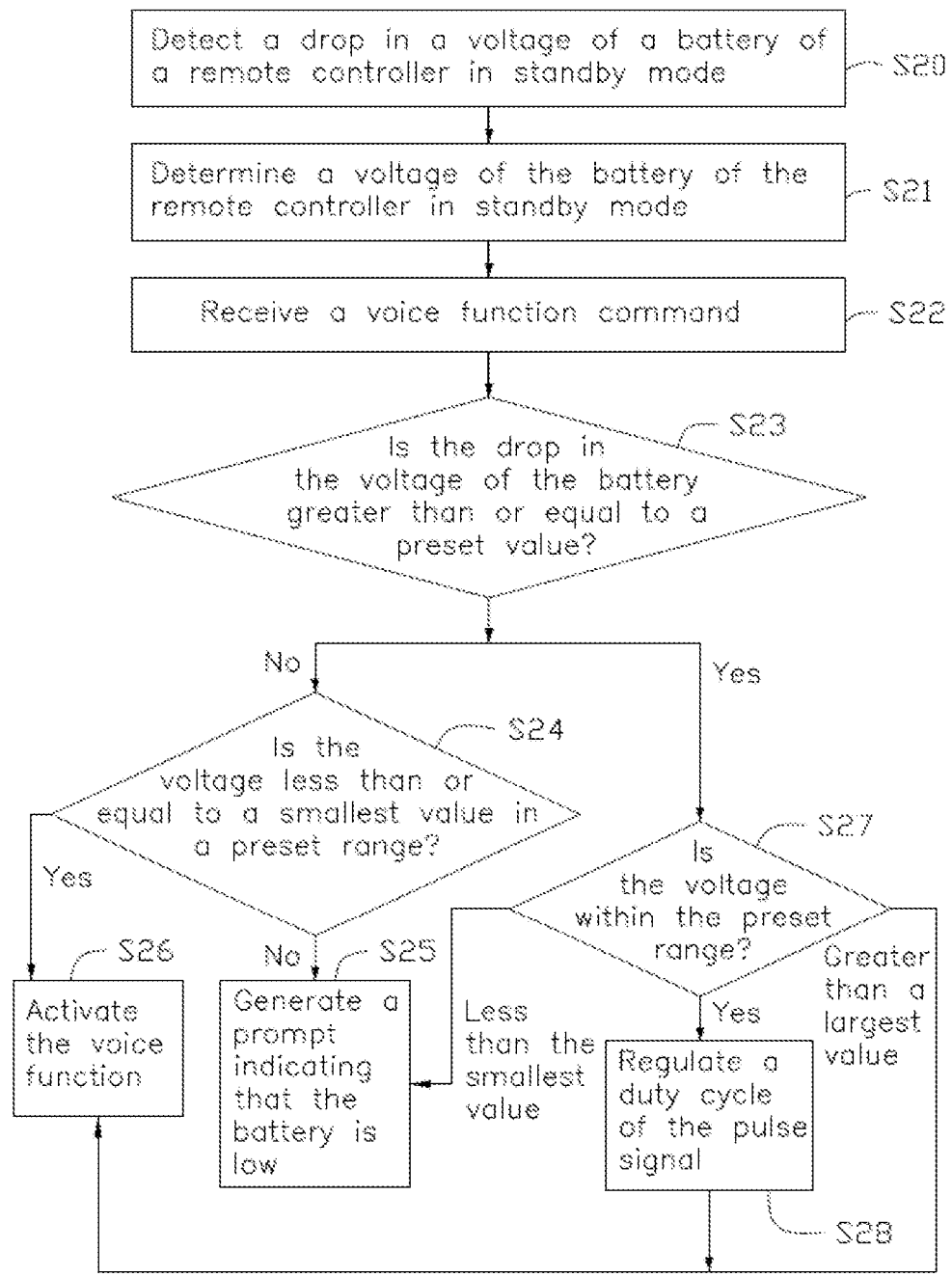
FIG. 2 is a flowchart illustrating a method for controlling the remote controller according to an embodiment of the present disclosure.

Referring to FIG. 2, a method for controlling a battery-powered remote controller is shown. The illustrated order of blocks is illustrative only and the order of the blocks can be changed. Additional blocks can be added or fewer blocks can be utilized without departing from this disclosure. The example method can begin at block S20.

At block S20, detecting a drop in a voltage of a battery of a remote controller in standby mode.

In the embodiment, the remote controller is a BLUETOOTH remote controller with a voice function. The voltage of the battery of the remote controller drops at regular intervals when the remote controller is in standby mode. The remote controller can include a number of keys, for example, on-off key, voice key, function key, channel switching key, number key, program schedule key, and so on. The remote controller receives a command to activate the voice function when the voice key of the remote controller is operated by the user in standby mode. Most electrical current is used by the remote controller when starting voice function. At the moment of starting the voice function, a rush of instant current arises may cause a drop in the voltage becoming greater, for example becoming from 0.2V to 0.8V. The greater drop in the voltage measured by a VBAT pin of a chip of the remote controller may cause serious problems. In the embodiment, the chip can be a RTL8762AR chip. When the drop in the voltage of the battery causes the voltage of the battery to reach a level which is lower than a minimum work voltage of the chip, an operating system of the remote controller will reset.

In the embodiment there are two variables, respectively an internal resistance of the battery of the remote controller and a slew rate of a switch starting the voice function. A drop in the voltage is likely to become greater at a moment that the voice function is started. The internal resistance of the battery of the remote controller is proportional to the drop in the voltage of the battery of the remote controller which occurs when starting the voice function. The slew rate of the switch starting the voice function is proportional to the drop in the voltage of the battery of the remote controller which occurs when starting the voice function. For example, when the slew rate of the switch starting the voice function increases, the drop in the voltage of the battery of the remote controller will appear greater, such as, becoming from 0.2V to 0.8V.

To avoid the consequence of the voice function failing, the internal resistance of the battery of the remote controller must be first determined. If the internal resistance of the battery of the remote controller remains small, the drop in the voltage when the voice function is started will be small. However, if the internal resistance of the battery of the remote controller is large, the slew rate of the switch starting the voice function should be lowered to decrease the drop in voltage when starting the voice function. Thus, the possibility of the remote controller resetting itself can be reduced.

In the embodiment, the internal resistance of the battery of the remote controller influences the drop in voltage which occurs when starting the voice function. The internal resistance of the battery of the remote controller is further proportional to the drop in voltage regularly appearing in standby mode. Thus, the internal resistance of the battery of the remote controller can be determined by examining the drops in voltage regularly appearing in standby mode.

In the embodiment, the block S20 comprises in detail:

(a): sampling a voltage of the battery of the remote controller within a timing period from a sampling start time t1 at a first preset sampling interval t2 in standby mode.

Figure 3A:
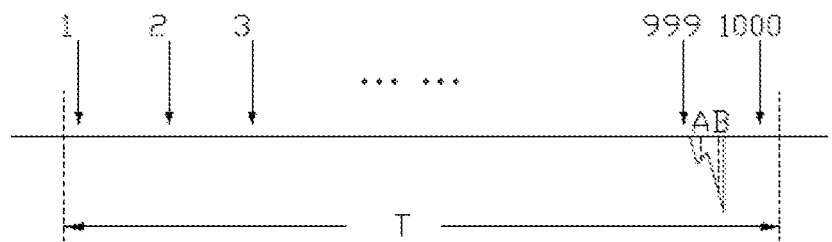
FIG. 3A is a schematic drawing illustrating sampling of a voltage of a battery of the remote controller in FIG. 1 within a timing period at a first preset sampling interval when in standby mode.
Figure 3B:
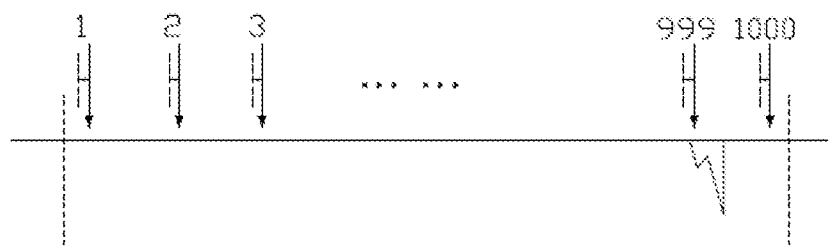
FIG. 3B is a schematic drawing illustrating the sampling of a voltage of the battery of the remote controller in FIG. 1 within next timing period at the first preset sampling interval when in standby mode.

In the embodiment, the voltage of the battery appears regularly at fixed intervals. In the embodiment, the fixed interval is one second. Thus, the timing period T of the voltage of the battery is one second. In the embodiment, the first preset sampling interval t2 is one millisecond. In the embodiment, the sampling start time t1 can be 0 seconds. It can be understood that the sampling start time t1 is not limited to 0 second, for example, it can be one second, or the like. For example, when the disclosure starts when the remote controller enters into the standby mode, the sampling start time t1 is 0 seconds, when the disclosure starts after the remote controller enters into the standby mode by 10 seconds or in response to user operation of pressing a button after 10 second, the sampling start time t1 is 10 seconds, or the like. For example, when the sampling start time t1 is 0 second, the timing period is the first timing period which is from 0 to one second. The next timing period is thus from one to two seconds, and so on. As FIG. 3A shows, for example, when sampling the voltage of the battery of the remote controller in standby mode for the period of 0 to one second, 1000 samples can be taken.

In the embodiment, the drop in the voltage appears regularly can be, for example, the drop in the voltage appears in the first timing period at 0.5 second, and another drop in the voltage appears in the second timing period at 1.5 seconds. The appearing time duration of the drop in each voltage is 100 microseconds. The drops in the voltage in the appearing time duration 100 microseconds may be different, as shown in FIG. 3A, the drop in the voltage in appearing time duration 100 microseconds at point A is different from the drop in the voltage in appearing time duration 100 microseconds at point B.

(b): determining whether a drop in the voltage is occurred within the sampled voltages.

In the embodiment, determining whether a drop in the voltage is occurred within the sampled voltages can include:
  determining if one voltage of the sampled voltages is different from a remaining of the sampled voltages by a predetermined value;
  determining that a drop in the voltage is occurred within the sampled voltages if there is one voltage different from the remaining of the sampled voltages by the predetermined value; and
  determining that no drop is occurred within the sampled voltages when no voltage different from the remaining of the sampled voltages is determined.

For example, when each of the voltages of the sampled voltages is 3V, it can be determined that no drop in the voltage is occurred within the sampled voltages. When one voltage of the sampled voltage is 2.3V and the remaining of the sampled voltages are each 3V, it can be determined that a drop in the voltage is occurred within the sampled voltages.

In the embodiment, the appearing time duration of the drop in the voltage itself may be too small relative to the overall timing period of the voltage. It may be difficult to position such a drop in the voltage within timing period, namely, there will be low probability that a drop in the voltage is occurred within the timing period.

(c): if no drop in the voltage is occurred in the sampled voltages, sampling the voltage of the battery of the remote controller within a next timing period from a next sampling start time t3 at the first preset sampling interval t2 in standby mode until a drop in the voltage is occurred, wherein the next sampling start time t3 is (t1+T+Δt1), where T is a timing period of the voltage of the battery of the remote controller, and Δt1 is a first time duration.

For example, when no drop in the voltage is occurred in the sampled voltage within the first timing period, the voltage of the battery is sampled within the second timing period from a next sampling start time to form another 1000 samples. Then, determining whether a drop in the voltage exists in the samples within the second timing period in the manner aforesaid. When no drop in the voltage exists within the second timing period, sampling the voltage within a third timing period from a third sampling start time to obtain another 1000 samples. Step (c) stops when a voltage in voltage is occurred in the 1000 samples within the third timing period.

In the embodiment, the first time duration $\Delta t1$ can be one half of the appearing time duration for the voltage to drop, namely, 50 microseconds. This can be varied to other values, for example, 25 microseconds, 12.5 microseconds, or the like. For example, when the timing period is one second and the sampling start time t1 is 0 seconds, the next sampling start time t3 can be equal to a total value of 0 seconds, one second, and 50 microseconds, namely, 1.00005 seconds.

Since the ratio of the first preset sampling interval t2 and the first time duration $\Delta t1$ is equal to 20, when no drop in the voltage exists in the new samples within the second timing period, the next sampling start time will be a total value of 1.00005 seconds, one second, and 50 microseconds, namely, 2.0001 seconds, and so on. Thus, the drop in the voltage may not be sampled within the third timing period as the aforesaid example, it may be found to be occurred within the twenty timing period.

(d): determining an appearing time of the drop in the voltage in the sampled voltages t4 in the timing period when the drop in the voltage is occurred.

For example, when a drop in the voltage is occurred within the first sample of the samples within fifth seconds, the method determines that the appearing time of the drop in the voltage in the sampled voltages t4 in the timing period when a drop in the voltage is occurred is 4.0002 seconds.

(e): sampling a subsequent voltage of the battery of the remote controller from a start time t5 at a second preset sampling interval t6 in standby mode to form a number of sampled voltages until the number of the samples is N, wherein the start time t5 is equal to a total of the appearing time of the drop in the sampled voltages t4 and the second preset sampling interval t6. The second preset sampling interval t6 is equal to a total of the timing period T and the second time duration $\Delta t2$, N is a positive integer, and a product of (N−1) and the second time duration $\Delta t2$ is greater than or equal to the appearing time duration of each of the drops in the voltage in the samples.

In the embodiment, the second time duration $\Delta t2$ is less than the first time duration $\Delta t1$. Since drops in the voltage appear regularly in the voltage of the battery, after the drop in the voltage is positioned in the measured voltage of the battery, the subsequent drop in the voltage appears at the same time in each timing period. In the embodiment, the appearing time duration of each drop in the voltage is 100 microseconds, the drop in the voltage at each point in the appearing time duration may be different, thus determining the drop in the voltage of the battery first requires that the number N is determined.

For example, when the appearing time duration of each drop in the voltage is 100 microseconds, and the second time duration $\Delta t2$ is 3 microseconds, a ratio of the appearing time duration of each drop in the voltage and the second time duration $\Delta t2$ is about 33.33, thus N is equal to a total of thirty-four and one, namely thirty-five. When the appearing time duration of each drop in the voltage is 99 microseconds, and the second time duration $\Delta t2$ is 3 microseconds, a ratio of the appearing time duration of each drop in the voltage and the second time duration $\Delta t2$ is about 33, thus N is equal to a total of thirty-three and one, namely thirty-four.

In the embodiment, the step (e) can be, for example, when the second time duration $\Delta t2$ is 3 microseconds and the appearing time duration of each drop in the voltage is 100 microseconds, the timing period sampling the voltage is twenty, and timing period of the voltage of the battery is one second, the method samples the voltage from 21 seconds every 1.000003 of a second to form 35 sampled voltages.

In the embodiment, step (e) includes:
sampling the subsequent voltage of the battery of the remote controller from the start time t5 at the second preset sampling interval t6 in standby mode to form a number of samples, wherein the start time t5 is equal to a total of the appearing time of the drop in the sampled voltages t4 and the second preset sampling interval t6. The second preset sampling interval t6 is equal to a total of the timing period T and the second time duration $\Delta t2$;
determining whether a voltage of next sample is equal to a voltage of previously sample;
continuously sampling the voltage of the battery of the remote controller at the second preset sampling interval t6 in standby mode until the number of samples is N and a voltage of next sample is not equal to a voltage of previously sample;
determining that a time lap is $(T-(N-1)\times \Delta t2)$ when a voltage of next sample is equal to a voltage of previously sample;
updating a sampling time of next sample to a total of the time lap and the time previously to sample the next sample;
continuously sampling the subsequent voltage of the battery of the remote controller from the updated sampling time at the second preset sampling interval t6 in standby mode until the number of the samples is N.

Figure 4A:
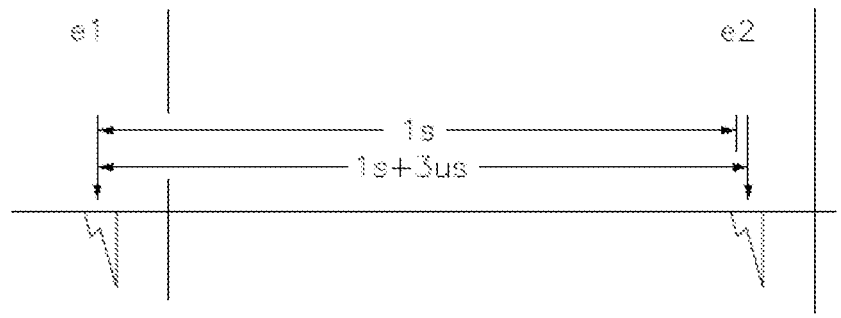
FIG. 4A is a schematic drawing illustrating sampling voltage after a drop in voltage is determined when in standby mode according to the present disclosure.
Figure 4B:
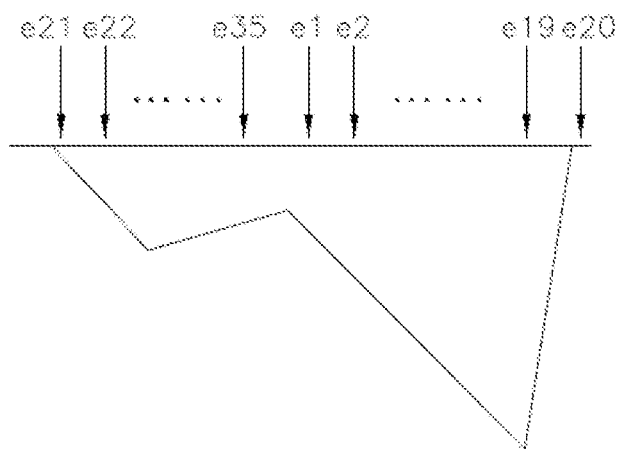
FIG. 4B is a schematic drawing illustrating positions of each sampled voltage at one appearing time duration when all the sampled voltages are on the one appearing time duration.

For example, as shown in FIG. 4A, when a drop in the voltage is occurred within the twenty seconds, the method samples the voltage e1 within twenty-one seconds at a fixed interval, for example 1.000003 of a second. When a voltage of the next sample is equal to a voltage of previously sample, the method samples the voltage from 21 seconds to 55 seconds every 1.000003 of a second. Further referring to FIG. 4B, all the samples are shown on one drop in the voltage appearing time duration. In fifty-one seconds, the voltage of next sample e21 is equal to the voltage of previously sample within the fifty seconds e20. The method determines the time lap of e21 is (1−34*0.000003), namely, 999898 microseconds, and updates the sampling time of e21 by moving forward the time lap to sample e21. Next, the method continuously samples the voltage every 1.000003 of a second. Thus, the samples can represent the drops in voltage in appearing time duration.

(f): determining a drop in the voltage of each of the samples.

In the embodiment, the step (f) includes:
determining a standard voltage;
determining a drop in the voltage of each of the samples is equal to a value of subtracting the voltage of the sample from the standard voltage.

In the embodiment, the method determines the standard voltage is equal to the largest voltage of the samples.

For example, the standard voltage is 3V and the voltage of one sample is 2.8V, the method determines that the drop in the voltage is equal to (3V−2.8V), namely 0.2V.

(g): determining that the drop in the voltage of the battery of the remote controller in standby mode is equal to a largest drop in the voltage among the samples.

For example, the samples are e1, e2, . . . , e34, and e35, the largest drop in the voltage among the samples e1, e2, . . . , e34, and e35 are 0.8V, the method determines that the drop in the voltage of the battery of the remote controller is the largest drop in the voltage, namely, 0.8V. In the embodiment, the largest drop in the voltage among the samples is the smallest voltage among the samples.

In the embodiment, although the probability that a drop in the voltage is occurred within the timing period is low, the drop in the voltage may be occurred within the timing period, thus, in step (b), when a drop in the voltage is occurred in the sample within the timing period, the procedure goes to step (d).

At block S21, determining a voltage of the battery of the remote controller in standby mode.

In the embodiment, the block S21 includes:
activating an ADC to sample the voltage of the battery of the remote controller at preset intervals in standby mode until sampling a preset number of voltages. For example, activating the ACD to sample the voltage of the battery of the remote controller every five seconds in standby mode to sample ten voltages.
determining a largest voltage among the ten voltages;
determining a smallest voltage among the ten voltages;
determining an average value of the voltages excluding the largest voltage and the smallest voltage;
determining that the voltage of the battery of the remote controller is equal to the average value.

At block S22, receiving the voice function command.

In the embodiment, the remote controller receives such command when the voice key of the remote controller is operated by the user in standby mode.

At block S23, determining whether the drop in the voltage of the battery of the remote controller in standby mode is greater than or equal to a preset value. If the drop in the voltage of the battery of the remote controller in standby mode is less than a preset value, the procedure goes to step S24. If the drop in the voltage of the battery of the remote controller in standby mode is greater than or equal to a preset value, the procedure goes to step S27.

In the embodiment, the preset value is 100mv. The preset value can be any other suitable value. The drop in the voltage is proportional to the internal resistance of the battery, and the internal resistance of the battery is inversely proportional to quantity of the battery. For example, when the drop in the voltage is lower, the internal resistance of the battery is lower and the quantity of the battery is better, thus the probability of resetting the operating system of the remote controller is lower when starting the voice function. When the drop in the voltage is higher, the internal resistance of the battery is higher and the quantity of the battery is worse, thus the probability of resetting the operating system of the remote controller is higher when starting the voice function.

In the embodiment, when the drop in the voltage is less than the preset value, the quality of the battery is better, thus the signal of the remote controller does not need to be modulated. When the drop in the voltage is greater than the preset value, the quality of the battery is worse, the probability of resetting the operating system of the remote controller is higher when starting the voice function. Thus, the signal of the remote controller needs to be modulated. Then, the probability of resetting the operating system of the remote controller will be lower.

At block S24, determining whether the voltage is less than or equal to a smallest value in a preset range. If such voltage is less than or equal to a smallest value in the preset range, the procedure goes to step S25. If the voltage is greater than a smallest value in the preset range, the procedure goes to step S26.

In the embodiment, the preset range is 2V-2.4V. The preset range can be varied according to a type of the chip of the remote controller. Since the quality of the battery is better, if the voltage is less than or equal to the smallest value in the preset range, it represents that the battery should be charged or replaced. If the voltage is greater than the smallest value in the preset range, then the battery is high, the probability of resetting the operating system of the remote controller is low when starting the voice function. At this moment therefore, the voice function can be activated.

At block S25, generating a prompt indicating that the battery is low, to prompt the user to charge or replace the battery.

At block S26, activating the voice function of the remote controller.

At block S27, determining whether the voltage is within a preset range. If the voltage is within the preset range, the procedure goes to step S28. If the voltage is greater than a largest value in the preset range, the procedure goes to step S26. If the voltage is less than a smallest value in the preset range, the procedure goes to step S25.

In the embodiment, the preset range is 2V-2.4V. The preset range can be varied according to a type of the chip of the remote controller. Since the quality of the battery is worse, if the voltage is within the preset range, the signal of the remote controller needs to be modulated, for example a duty cycle of a pulse signal which is configured to activate the switch needs to be modulated, to decrease the slew rate of the switch starting the voice function. Thus, the drop in the voltage when starting the voice function is decreased. If the voltage is greater than the largest value in the preset range, namely, the voltage is greater than 2.4V, it represents that the voltage of the battery is high, for activation of the voice function of the remote controller. If the voltage is less than the smallest value in the preset range, namely, the voltage is less than 2V, it represents that the voltage of the battery is low, and the battery should be charged or replaced.

At block S28, regulating a duty cycle of the pulse signal which is configured to activate the voice function of the remote controller according to the voltage.

In the embodiment, an enable pin of the chip of the remote controller receives the pulse signal. The pulse signal is configured to control the slew rate of the switch starting the voice function. In the embodiment, the block S28 includes:
regulating a duty cycle of the pulse signal which is configured to activate the voice function of the remote controller according to the voltage and a preset relationship between the voltage and the duty cycle of the pulse signal.

For example, when the preset relationship includes the voltage being 2.4V and the duty cycle of the pulse signal being 0.5, and also includes the voltage being 2V and the duty cycle of the pulse signal being 0.25, the method regulates the duty cycle of the pulse signal to 0.5 when the voltage is 2.4V.

Figure 5:
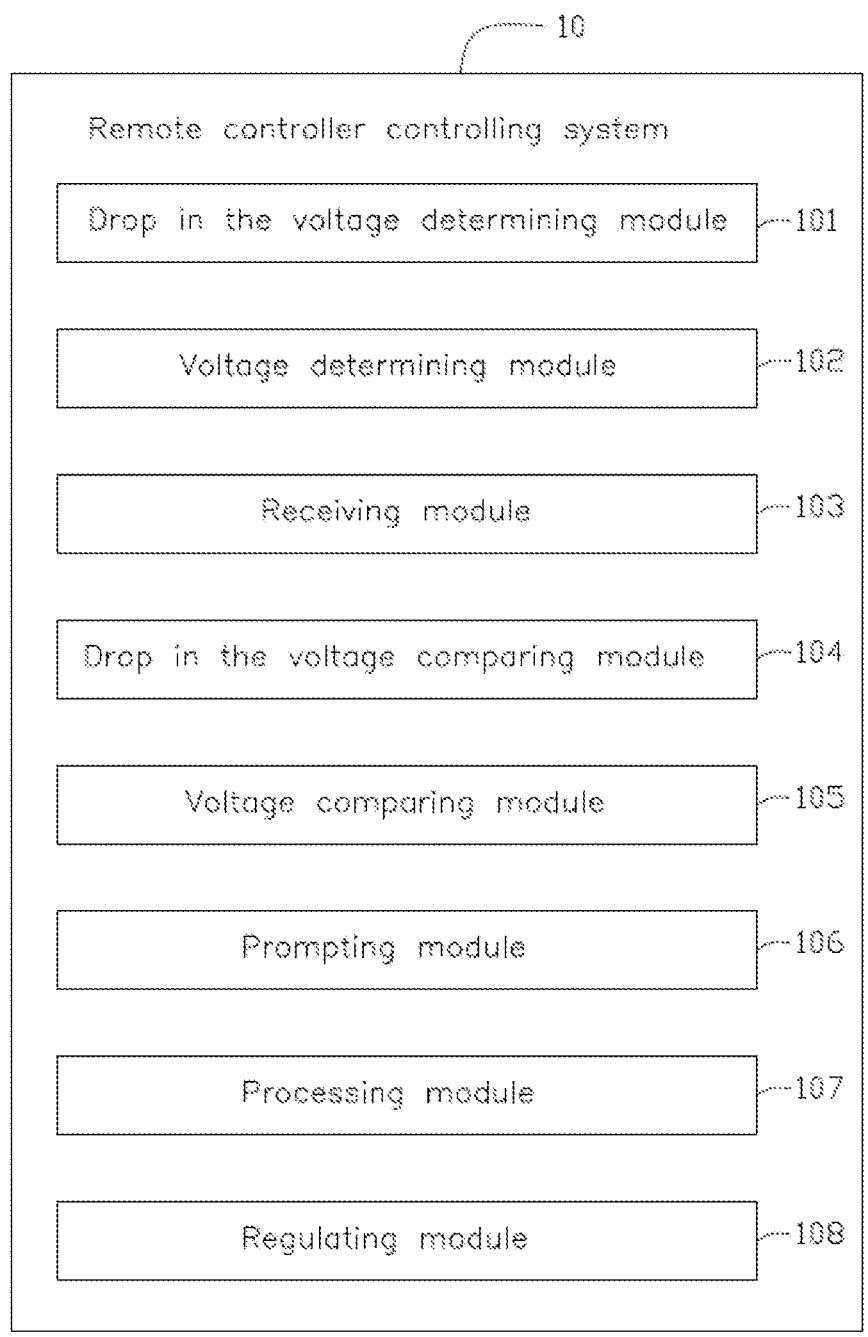
FIG. 5 is a block diagram illustrating a system for controlling a battery-powered remote controller according to an embodiment of the present disclosure.

FIG. 5 illustrates a block diagram of an embodiment of a remote controller controlling system 10.

In the embodiment, the remote controller controlling system 10 is applied in the remote controller 1. The remote controller 1 includes a communication unit. The communication unit can be a BLUETOOTH unit, or the like. The remote controller controlling system 10 can be one or more programs. The one or more programs are stored in the storage device, and executed by the at least one processor to accomplish the required function.

In the embodiment, the one or more programs can be divided into one or more modules/units, for example, a drop in the voltage determining module 101, a voltage determining module 102, a receiving module 103, a drop in the voltage comparing module 104, a voltage comparing module 105, a prompting module 106, a processing module 107, and a regulating module 108. The drop in the voltage determining module 101 is configured to detect a drop in a voltage of a battery of the remote controller in standby mode. The voltage determining module 102 is further configured to determine a voltage of the battery of the remote controller. The receiving module 103 is configured to receive a voice function command. The drop in the voltage comparing module 104 is configured to determine whether the drop in the voltage of the battery of the remote controller in standby mode is greater than or equal to a preset value. The voltage comparing module 105 is configured to determine whether the voltage is less than or equal to a smallest value in a preset range when the drop in the voltage of the battery of the remote controller in standby mode is less than a preset value, and determine whether the voltage is within the preset range when the drop in the voltage of the battery of the remote controller in standby mode is greater than or equal to the preset value. The prompting module 106 is configured to generate a prompt indicating that the battery is low, to prompt the user to charge or replace the battery when the drop in the voltage of the battery of the remote controller in standby mode is less than a preset value and the voltage is less than or equal to the smallest value in the preset range or when the drop in the voltage of the battery of the remote controller in standby mode is greater than or equal to the preset value and the voltage is less than the smallest value in the preset range. The processing module 107 is configured to activate the voice function of the remote controller when the drop in the voltage of the battery of the remote controller in standby mode is less than a preset value and the voltage is greater than a smallest value in the preset range or after the duty cycle of the pulse signal which is configured to activate the voice function of the remote controller being regulated. The regulating module 108 is configured to regulate a duty cycle of the pulse signal which is configured to activate the voice function of the remote controller according to the voltage when the drop in the voltage of the battery of the remote controller in standby mode is greater than or equal to the preset value and the voltage is within the preset range.

The at least one processor can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor can be a microprocessor or the at least one processor can be any regular processor, or the like. The at least one processor can be a control center of the remote controller, using a variety of interfaces and lines to connect various parts of the entire remote controller.

The storage device stores the one or more programs and/or modules/units. The at least one processor can run or execute the one or more programs and/or modules/units stored in the storage device, call out the data stored in the storage device, and accomplish the various functions of the remote controller, for example apply the methods hereinbefore described. The storage device may include a program area and a data area. The program area can store an operating system, and applications that are required for the at least one function, such as sound playback features, images playback functions, and so on. The data area can store data created according to the use of the remote controller, such as video data, audio data, photobook data, and so on. In addition, the storage device can include random access memory and non-transitory storage, such as hard disk, memory, plug-in hard disk, smart media card, secure digital, flash card, at least one disk storage device, flash memory, or other transitory storage medium.

If the integrated module/unit of the remote controller is implemented in the form of or by means of a software functional unit and is an independent product sold or used, all parts of the integrated module/unit of the remote controller may be stored in a computer-readable storage medium. The remote controller can use one or more programs to control the related hardware to accomplish all parts of the methods of this disclosure. The one or more programs can be stored in a computer-readable storage medium. The one or more programs can accomplish the block of the exemplary method when executed by the at least one processor. The one or more stored programs can include program code. The program code can be in the form of source code, object code, executable code file, or in some intermediate form. The computer-readable storage medium may include any entity or device capable of recording and carrying the program codes, recording media, USB flash disk, mobile hard disk, disk, computer-readable storage medium, read-only memory, Random access memory, electrical carrier signals, telecommunications signals, and software distribution package. The content stored in the computer-readable storage medium can be increased or decreased in accordance with legislative requirements and regulations of patent practice jurisdictions, for example, in some jurisdictions, legislation and patent practice stipulating that a computer-readable storage medium does not include electrical carrier signals or telecommunications signals.

In the present disclosure, it should be understood that the disclosed methods and electronic devices can be employed or achieved in other ways. The electronic device exemplified is only illustrative.

In addition, function units in the embodiments of the present disclosure may be integrated into one processing unit, or each of the units may exist alone physically, or two or more units can be integrated into one unit. The integrated unit may be implemented in a form of hardware, or may be implemented in a form of hardware in addition to a software function unit.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A remote controller controlling method comprising:
    sampling a voltage of a battery of the remote controller in a standby mode within a time period;
    determining whether a first voltage drop is occurred within the sampled voltage;
    sampling a subsequent voltage of the battery of the remote controller in the standby mode to form a plurality of samples when the first voltage drop is occurred within the sampled voltage;
    detecting a second voltage drop of each of the plurality of samples;

determining that the first voltage drop of the battery of the remote controller in the standby mode is equal to a largest voltage drop among the second voltage drops of the plurality of samples;

receiving a voice function command to activate a voice function of the remote controller;

determining whether the first voltage drop of the battery of the remote controller in the standby mode is greater than or equal to a preset value;

determining whether the voltage is within a preset range when the first voltage drop of the battery of the remote controller in the standby mode is greater than or equal to the preset value;

regulating a duty cycle of a pulse signal which is configured to activate the voice function of the remote controller according to the voltage when the voltage is within the preset range; and activating the voice function of the remote controller.

2. The method of claim 1, wherein the method further comprises:

activating the voice function of the remote controller when the voltage is greater than a largest value in the preset range; and generating a prompt signal indicating battery power is low when the voltage is less than or equal to a smallest value in the preset range.

3. The method of claim 2, wherein the method further comprises:

determining whether the voltage is less than or equal to the smallest value in the preset range when the first voltage drop of the battery of the remote controller in the standby mode is less than the preset value;

generating the prompt signal indicating that the battery power is low when the voltage is less than or equal to the smallest value in the preset range;

activating the voice function of the remote controller when the voltage is greater than the smallest value in the preset range.

4. The method of claim 1, wherein sampling the subsequent voltage of the battery of the remote controller in the standby mode to form the plurality of samples further comprises:

determining whether a voltage of a next sample is equal to a voltage of a sample before the next sample in the plurality of samples;

continuously sampling the subsequent voltage of the battery of the remote controller in standby mode until the voltage of the next sample is not equal to the voltage of the sample before the next sample;

determining a time lap when the voltage of the next sample is equal to the voltage of the sample before the next sample;

updating a sampling time of the next sample to a total of the time lap and the time previously to sample the next sample; and continuously sampling the subsequent voltage of the battery of the remote controller.

5. The method of claim 1, wherein determining whether the first voltage drop is occurred within the sampled voltage further comprises:

sampling the voltage of the battery of the remote controller within the timing period from a sampling start time t1 at a first preset sampling interval t2 in the standby mode;

if no voltage drop is occurred in the sampled voltage, sampling the voltage of the battery of the remote controller within a next timing period from a next sampling start time t3 at the first preset sampling interval t2 in the standby mode until the first voltage drop is occurred, wherein the next sampling start time t3 is (t1+T+$\Delta$t1), where T is the timing period of the voltage of the battery of the remote controller, and $\Delta$t1 is a first time duration;

determining an appearing time t4 of the first voltage drop in the sampled voltage in the timing period when the first voltage drop is occurred;

sampling the subsequent voltage of the battery of the remote controller from a start time t5 at a second preset sampling interval t6 in the standby mode to form the plurality of samples until a number of the plurality of samples is N, wherein the start time t5 is equal to a total of the appearing time t4 of the first voltage drop in the sampled voltage and the second preset sampling interval t6, the second preset sampling interval t6 is equal to a total of the timing period T and a second time duration $\Delta$t2, N is a positive integer, and a product of (N−1) and the second time duration $\Delta$t2 is greater than or equal to a appearing time duration of each of the second voltage drops of the plurality of samples, wherein the second time duration is less than the first time duration.

6. The method of claim 5, wherein sampling the subsequent voltage of the battery of the remote controller in the standby mode to form the plurality of samples when the first voltage drop is occurred within the sampled voltage further comprises:

sampling the subsequent voltage of the battery of the remote controller from the start time t5 at the second preset sampling interval t6 in the standby mode to form the plurality of samples until the number of the plurality of samples is N;

sampling the subsequent voltage of the battery of the remote controller from the start time t5 at the second preset sampling interval t6 in the standby mode to form the plurality of samples, wherein the start time t5 is equal to a total of the appearing time of the voltage drop in the sampled voltages t4 and the second preset sampling interval t6, the second preset sampling interval t6 is equal to the total of the timing period T and the second time duration $\Delta$t2;

determining whether a voltage of a next sample is equal to a voltage of a sample before the next sample in the plurality of samples;

continuously sampling the subsequent voltage of the battery of the remote controller at the second preset sampling interval t6 in the standby mode until the number of the plurality of samples is N and the voltage of the next sample is not equal to the voltage of the sample before the next sample;

determining that a time lap is (T−(N−1)×$\Delta$t2) when the voltage of the next sample is equal to the voltage of the sample before the next sample;

updating a sampling time of the next sample to a total of the time lap and the time previously to sample the next sample; and continuously sampling the subsequent voltage of the battery of the remote controller from the updated sampling time at the second preset sampling interval t6 in the standby mode until the number of the plurality of samples is N.

7. The method of claim 1, wherein determining whether the first voltage drop is occurred within the sampled voltage further comprises:

determining if the sampled voltage is different from a remaining of the sampled voltages by a predetermined value;

determining that the first voltage drop is occurred within the sampled voltages if the sampled voltage is different from the remaining of the sampled voltages by the predetermined value; and determining that no voltage drop is occurred if no voltage different from the remaining of the sampled voltages is determined.

8. A remote controller comprising:

a storage device;

at least one processor; and the storage device storing one or more programs, which when executed by the at least one processor, cause the at least one processor to:

sample a voltage of a battery of the remote controller in a standby mode within a time period;

determine whether a first voltage drop is occurred within the sampled voltage;

sample a subsequent voltage of the battery of the remote controller in the standby mode to form a plurality of samples when the first voltage drop is occurred within the sampled voltage;

detect a second voltage drop of each of the plurality of samples;

determine that the first voltage drop of the battery of the remote controller in the standby mode is equal to a largest voltage drop among the second voltage drops of the plurality of samples;

receive a voice function command to activate a voice function of the remote controller;

determine whether the first voltage drop of the battery of the remote controller in the standby mode is greater than or equal to a preset value;

determine whether the voltage is within a preset range when the first voltage drop of the battery of the remote controller in the standby mode is greater than or equal to the preset value;

regulate a duty cycle of a pulse signal which is configured to activate the voice function of the remote controller according to the voltage when the voltage is within the preset range; and activate the voice function of the remote controller.

9. The remote controller of claim 8, wherein the at least one processor is further caused to:

activate the voice function of the remote controller when the voltage is greater than a largest value in the preset range; and generate a prompt signal indicating battery power is low when the voltage is less than or equal to a smallest value in the preset range.

10. The remote controller of claim 9, wherein further cause the at least one processor to:

determine whether the voltage is less than or equal to the smallest value in the preset range when the voltage drop of the battery of the remote controller in standby mode is less than the preset value;

generate a prompt signal indicating the battery power is low when the voltage is less than or equal to the smallest value in the preset range;

activate the voice function of the remote controller when the voltage is greater than the smallest value in the preset range.

11. The remote controller of claim 8, wherein sampling the subsequent voltage of the battery of the remote controller in standby mode to form a plurality of samples comprises:

determining whether a voltage of a next sample is equal to a voltage of a sample before the next sample in the plurality of samples;

continuously sampling the subsequent voltage of the battery of the remote controller in standby mode until the voltage of the next sample is not equal to the voltage of the sample before the next sample;

determining a time lap when the voltage of the next sample is equal to the voltage of the sample before the next sample;

updating a sampling time of the next sample to a total of the time lap and the time previously to sample the next sample; and continuously sampling the subsequent voltage of the battery of the remote controller.

12. The remote controller of claim 8, wherein the determining whether the first voltage drop is occurred within the sampled voltage further comprises:

sampling the voltage of the battery of the remote controller within a timing period from a sampling start time t1 at a first preset sampling interval t2 in standby mode;

if no voltage drop is occurred in the sampled voltages, sampling the voltage of the battery of the remote controller within a next timing period from a next sampling start time t3 at the first preset sampling interval t2 in standby mode until a voltage drop is occurred, wherein the next sampling start time t3 is (t1+T+Δt1), where T is a timing period of the voltage of the battery of the remote controller, and Δt1 is a first time duration;

determining an appearing time of the voltage drop in the sampled voltage t4 in the timing period when the voltage drop is occurred;

sampling a subsequent voltage of the battery of the remote controller from a start time t5 at a second preset sampling interval t6 in standby mode to form a plurality of samples until the number of the samples is N, wherein the start time t5 is equal to a total of the appearing time of the drop in the sampled voltages t4 and the second preset sampling interval t6, the second preset sampling interval t6 is equal to a total of the timing period T and the second time duration Δt2, N is a positive integer, and a product of (N−1) and the second time duration Δt2 is greater than or equal to the appearing time duration of each of the voltage drop in the samples, wherein the second time duration is less than the first time duration.

13. The remote controller of claim 12, wherein the sampling a subsequent voltage of the battery of the remote controller in the standby mode to form the plurality of samples when the first voltage drop is occurred within the sampled voltage further comprises:

sampling a subsequent voltage of the battery of the remote controller from the start time t5 at the second preset sampling interval t6 in standby mode to form a plurality of samples until the number of the samples is N;

sampling the subsequent voltage of the battery of the remote controller from the start time t5 at the second preset sampling interval t6 in standby mode to form a plurality of samples, wherein the start time t5 is equal to a total of the appearing time of the voltage drop in the sampled voltages t4 and the second preset sampling interval t6, the second preset sampling interval t6 is equal to the total of the timing period T and the second time duration Δt2;

determining whether a voltage of next sample is equal to a voltage of previously sample;

continuously sampling the voltage of the battery of the remote controller at the second preset sampling interval t6 in standby mode until the number of the samples is N and a voltage of next sample is not equal to a voltage of previously sample;

determining that a time lap is (T−(N−1)×Δt2) when a voltage of next sample is equal to a voltage of previously sample;

updating a sampling time of next sample to a total of the time lap and the time previously to sample the next sample;

continuously sampling the subsequent voltage of the battery of the remote controller from the updated sampling time at the second preset sampling interval t6 in standby mode until the number of the samples is N.

14. The remote controller of claim 8, wherein the determining whether the first voltage drop is occurred within the sampled voltages comprises:

determining if the sampled voltage is different from a remaining of the sampled voltages by a predetermined value;

determining that the first voltage drop is occurred within the sampled voltages if the sampled voltage is different from the remaining of the sampled voltages by the predetermined value; and determining that no voltage drop is occurred if no voltage different from the remaining of the sampled voltages is determined.

15. A non-transitory storage medium storing a set of instructions, when the set of instructions being executed by a processor of a remote controller, the processor being configured to perform a method for controlling the remote controller, wherein the method comprises:

sampling a voltage of a battery of the remote controller in a standby mode within a time period;

determining whether a first voltage drop is occurred within the sampled voltage;

sampling a subsequent voltage of the battery of the remote controller in the standby mode to form a plurality of samples when the first voltage drop is occurred within the sampled voltage;

detecting a second voltage drop of each of the plurality of samples;

determining that the first voltage drop of the battery of the remote controller in the standby mode is equal to a largest voltage drop among the second voltage drops of the plurality of samples;

receiving a voice function command to activate a voice function of the remote controller;

determining whether the first voltage drop of the battery of the remote controller in the standby mode is greater than or equal to a preset value;

determining whether the voltage is within a preset range when the first voltage drop of the battery of the remote controller in the standby mode is greater than or equal to the preset value;

regulating a duty cycle of a pulse signal which is configured to activate the voice function of the remote controller according to the voltage when the voltage is within the preset range; and activating the voice function of the remote controller.

\* \* \* \* \*